United States Patent [19]

Junike et al.

[11] 3,737,753
[45] June 5, 1973

[54] METHOD FOR DETERMINING, WITHOUT PHYSICAL CONTACT, THE SWIVEL POSITION OF A BODY CLAMPED INTO A ROTARY SUPPORT

[75] Inventors: Wilhelm August Karl Junike, 3 Hannover; Theodor Franz Hauck, Berlin, both of Germany

[73] Assignee: Werkzeugmaschinenfabrik Gildemeister & Comp. AG, Bielefeld, Germany

[22] Filed: Nov. 3, 1971

[21] Appl. No.: 195,325

[30] Foreign Application Priority Data

May 4, 1971 Germany............P 21 22 051.9

[52] U.S. Cl..................................318/602, 318/467
[51] Int. Cl..............................................G05b 19/28
[58] Field of Search...................318/602, 673, 601, 318/466–470

[56] References Cited

UNITED STATES PATENTS 3,104,351 9/1963 Rosenberg............................318/602
3,219,895 11/1965 Price......................................318/601
3,670,228 6/1972 Crosby..................................318/602

*Primary Examiner*—Bernard A. Gilheany
*Assistant Examiner*—Thomas Langer
*Attorney*—Owen, Wickersham & Erickson

[57] ABSTRACT

Apparatus for determining the swivel position of a body which is clamped into a rotary support rotating about a rotational axis and which is swiveled about a swivel axis that is angularly offset in relation to the rotational axis, and doing so without relying on physical contact. One or more transmitter element is supported on a rotary support and is swingable with the body eccentrically about the swivel axis. One or more scanning probe is disposed in a fixed position adjacent the rotary support, so that the transmitter element is moved past it without touching it when the support rotates. An interpretive device is controlled by the scanning probe and evaluates the offset of the transmitter element in relation to the scanning probe caused by the swiveling of the transmitter element, thereby determining the swivel position of the body.

8 Claims, 7 Drawing Figures

PATENTED JUN 5 1973  3,737,753

INVENTOR
WILHELM AUGUST KARL JUNIKE
THEODOR FRANZ HAUCK
BY Robt E Wickersham

Owen, Wickersham & Erickson
ATTORNEYS

PATENTED JUN 5 1973

INVENTOR
WILHELM AUGUST KARL JUNIKE
THEODOR FRANZ HAUCK
BY Robert Wickenham

Rosen, Wickersham & Erickson
ATTORNEYS 3,737,753

METHOD FOR DETERMINING, WITHOUT PHYSICAL CONTACT, THE SWIVEL POSITION OF A BODY CLAMPED INTO A ROTARY SUPPORT

BACKGROUND OF THE INVENTION

The invention relates to an apparatus for determining the swivel position of a body which is clamped into a support that is rotating about a rotational axis, the body being swiveled in the support about a swivel axis which is angularly offset in relation to the rotational axis.

The rotary support may, for example, be a hollow rotating chuck for a workpiece that is to be machined by a rotary machine, such as a lathe. In order that the workpiece can be machined from several sides, the chuck may be provided with a plurality of inwardly projecting gripping jaws for the workpiece, the gripping jaws swiveling about a swivel axis that extends perpendicularly to the rotational axis of the chuck. An example of a workpiece that must be machined from several sides is, for example, a valve housing having a plurality of radial sockets or flanges which are to be machined in the rotary machine. If the sockets are offset from each other in 90°—increments, the valve body must be moved in the chuck by 90° in order that the next socket may be brought into the prescribed operational position.

As a rule, the workpiece is swiveled in the chuck by a pivot drive provided on the chuck. The pivot drive may swivel the workpiece without its being necessary to interrupt the rotation of the chuck. Heretofore, the swivel position of the workpiece has been determined by mechanical devices which came into contact with the chuck or workpiece. However, this method has proved unsatisfactory, particularly since the contacting parts became worn in the course of time.

An important object of the invention is therefore to determine the swivel position of a body clamped into a rotary support rotating about a rotational axis and to do so without involving physical contact.

SUMMARY OF THE INVENTION

The apparatus of this invention is characterized by (1) at least one transmitter element provided on the rotary support and swiveling together with the body eccentrically about the swivel axis, (2) at least one scanning probe fixedly disposed adjacent the support, and past which the transmitter element is moved while leaving a clearance between the support and the transmitter element, and (3) an analyzing device controlled by the scanning probe for analyzing the offset of the transmitter element in relation to the scanning probe, as produced by the rotation of the transmitter element, to determine the rotational position of the body.

A plurality of scanning probes is preferably provided and disposed so that, with each predetermined swivel position of the body, the transmitter is moved past one of the scanning probes.

To increase the possibilities of variation in the selection of rotational positions, a plurality of transmitters may be provided at a variable distance from the swivel axis of the rotary support and offset by a predetermined swivel angle, the scanning probes being disposed so that at least one transmitter is moved past a scanning probe in each predetermined swivel position of the body.

The scanning probes may be, for example, proximity switches, and the transmitters for actuating the proximity switches may be suitable trigger cams. The scanning probes may be arranged in a row parallel to the rotational axis of the rotary support. The scanning probes are preferably assembled in a measuring head.

If the rotary support is in the form of a hollow chuck with two inwardly projecting clamping jaws which swivel about the swivel axis and serve for gripping a workpiece to be machined, the transmitters may be disposed on the outwardly pointing face of a plate connected to one of the clamping jaws and swiveling about the swivel axis.

In a further suitable development, the analyzing device may comprise a selector unit for selecting the desired swivel position of the body as well as an interpretive logic controlling a swivel drive on the rotary support, so that the swivel drive is switched on when the interpretive logic senses an undesired swivel position, and is switched off when the interpretive logic senses the desired swivel position.

It is possible for errors in measuring to occur due to chips flying past the scanning probes. It is therefore advisable to construct the interpretive logic so that, of two control pulses fed to the logic by the scanning probes at any time whose chronological interval falls short of a minimum interval, only the last pulse is analyzed and the reaction produced by the first pulse is corrected.

Other objects and advantages of the invention will appear from the following description of a preferred embodiment of the invention.

DESCRIPTION OF A PREFERRED EMBODIMENT

Figure 1:
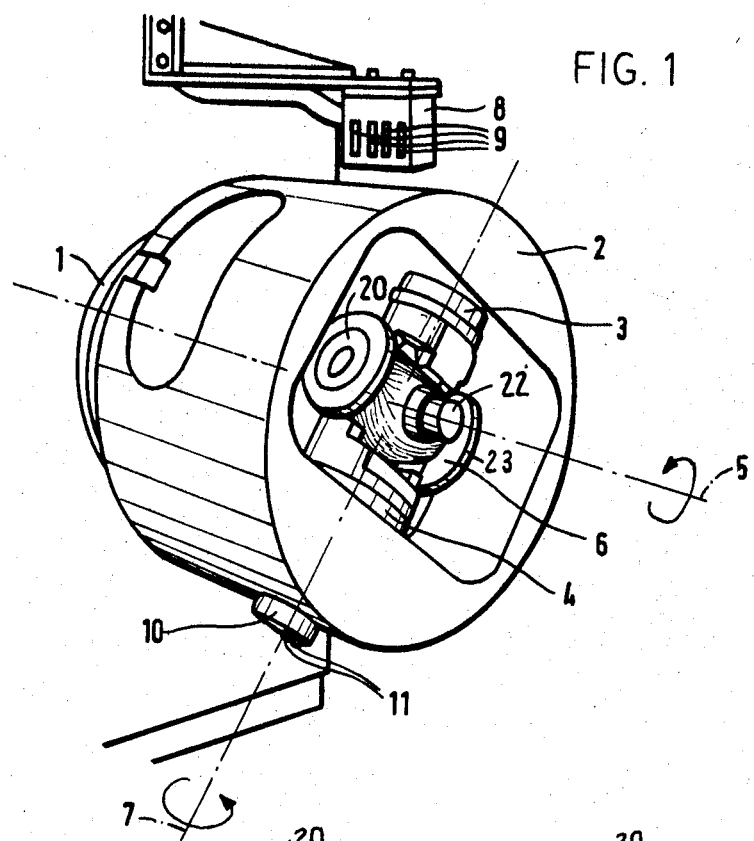
FIG. 1 is a view in perspective of a preferred embodiment of the principles of the invention, including a chuck into which a workpiece is swingably clamped, in combination a device for determining the swivel position of the workpiece, without making physical contact with the workpiece or the chuck.

FIG. 1 shows a lathe 1 of a rotary machine with a hollow chuck 2 secured thereon. The chuck 2 is provided with two clamping jaws 3 and 4; these jaws 3 and 4 project into the interior of the chuck 2 from diametrically opposite sides, and both of them are swiveled about a swivel axis 7, as by means by a pivot drive (not shown). The lathe 1, the chuck 2 and the clamping jaws 3 and 4 rotate together as an assembly about a rotational axis 5.

Figures 2, 3:
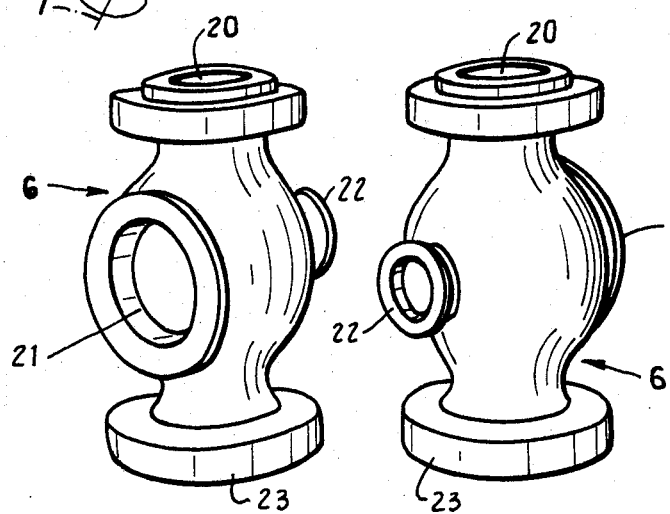
FIG. 2 is a view in perspective of the workpiece which in FIG. 1 is clamped into the chuck.
FIG. 3 is another view in perspective of the same workpiece, viewed from another angle.
Figure 4:
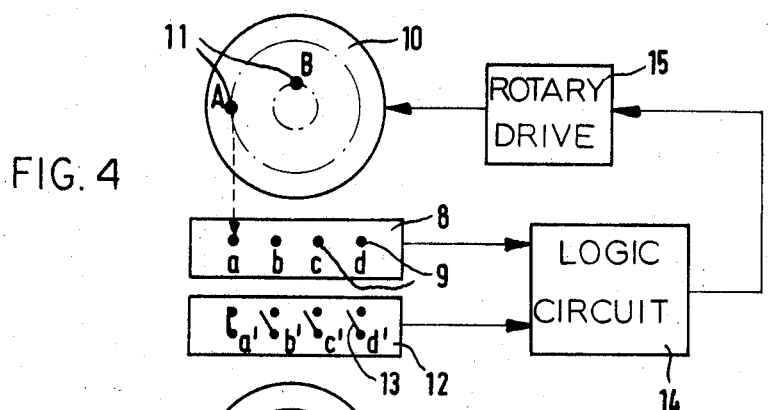
FIG. 4 is a schematic representation and block diagram of the device of FIG. 1 for determining the swivel position of the workpiece, without making physical contact.
Figure 5:
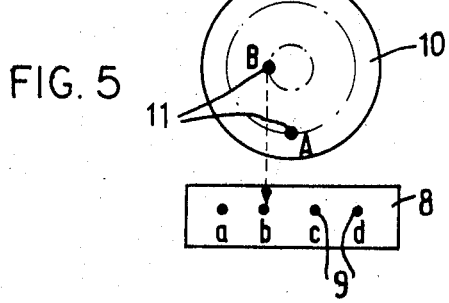
FIG. 5 is a similar view of a portion of FIG. 4, with the parts in a different position.
Figure 6:
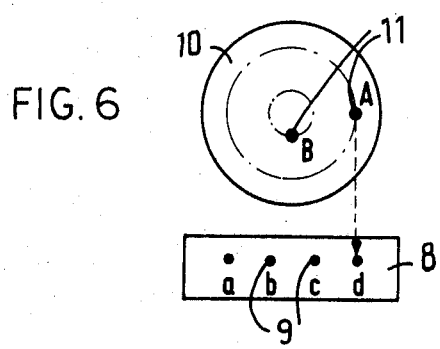
FIG. 6 is a view similar to FIG. 5, with parts shown in a third position.
Figure 7:
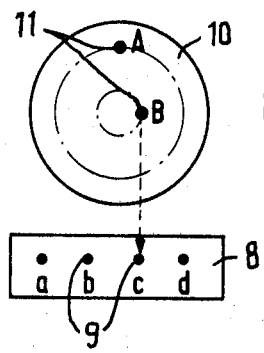
FIG. 7 is another view similar to FIG. 5 with the parts in a fourth position.

A workpiece 6 is firmly clamped between the jaws 3 and 4. The workpiece 6, shown in greater detail in FIGS. 3 and 4, is illustrated by way of example as a valve housing which has four sockets 20, 21, 22, and 23 offset by 90° and disposed in one plane. The valve housing 6 is clamped between the jaws 3 and 4 so that the plane in which the sockets 20, 21, 22, and 23 are disposed extends perpendicularly to the swivel axis 7.

After each swiveling motion of the workpiece by 90°, another socket is brought into operational position. The chuck 2 may, for example, form part of a rotary machine which is to give the sockets a finishing turning.

To enable determination of the swivel position of the workpiece 6 in the chuck 2, a plate 10 is provided on the outside of the chuck 2 and is connected with the jaw 4. On its outwardly directed face, the plate 10 carries two trip cams 11 which are eccentrically offset by 90° in relation to the swivel axis 7. When the workpiece 6 is swiveled by the jaw 4, the plate 10 is also swiveled by the jaw 4.

Adjacent to the chuck 2, and spaced from it, is provided a fixed measuring head 8 containing four scanning probes 9. The four scanning probes 9 are arranged in a row parallel to the rotational axis 5 of the chuck 2. The scanning probes 9 are proximity switches, each of which is actuated when one of the trip cams 11 reaches a certain proximity, in this instance underneath and in alignment with the switch. The switches 9 are disposed so that a clearance always exists between them and the trip cams 11. This insures scanning without any need of physical contact.

In FIGS. 4–7, the operational principle of the apparatus for scanning without relying on physical contact is schematically represented. The two trigger cams 11 on the plate 10 are designated A and B. The four proximity switches 9 are designated $a$, $b$, $c$ and $d$. The switches 9 are disposed so that in each of the four swivel positions of the workpiece 6, which are offset by 90° in relation to each other, one of the trigger cams 11 passes with a predetermined clearance relative to and underneath one of the proximity switches 9.

The desired swivel positions are adjusted on a selector unit 12 provided with four selector switches 13 corresponding to the four approximation switches 9. The selector switches 13 are designated $a'$, $b'$, $c'$ and $d'$. An interpretive logic 14 examines whether the swivel position established by the measuring head 8 coincides with the swivel position adjusted on the selector unit 12. If there is no coincidence, then the interpretive logic 14 turns on the swivel or pivot drive 15, thus causing further swiveling of the workpiece 6. The workpiece 6 is swiveled so long until the correct swivel position has been established.

From the four swivel positions illustrated in FIGS. 4–7 it will be seen that, with each rotation of the plate 10 by 90°, one of the two trigger cams 11 passes underneath and in line with one of the proximity switches 9.

By modifying the number and arrangement of the proximity switches and the trigger cams, a multiplicity of swivel positions or angular positions is obtained.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. Apparatus for determining the swivel position of a body which is held in a rotary support rotating about a rotational axis by clamps which are swiveled in said rotary support to rotate about a swivel axis which is angularly offset in relation to said rotational axis, comprising:

at least one transmitter element mounted on one said clamp eccentric to said swivel axis and thereby swiveling with said body but eccentrically about said swivel axis, at least one scanning probe disposed in a fixed position adjacent said rotary support and past which said transmitter element is moved by rotation of said rotary support with a clearance at all times between said scanning probe and said transmitter element, and interpreting means controlled by said scanning probe for evaluating the offset of said transmitter element in relation to said scanning probe as offset is caused by swiveling of said transmitter element when said body and said clamps swivel relative to said rotary support, thereby determining the swivel position of said body.

2. Apparatus in accordance with claim 1, wherein a plurality of scanning probes is provided, each at a different fixed position, said probes being so disposed in their positions that, with each of a series of predetermined swivel positions of said body said transmitter element is moved past one and only one said scanning probe.

3. Apparatus in accordance with claim 2, characterized in that a plurality of transmitter elements is provided, each mounted on one said clamp and each lying at a different distance from said swivel axis, said transmitter elements being offset from each other by a predetermined swivel angle, said scanning probes being so disposed that, with each said predetermined swivel position of said body, at least one transmitter is moved past one said scanning probe.

4. Apparatus in accordance with claim 2 wherein said scanning probes are disposed in a row parallel to the rotational axis of said support.

5. Apparatus in accordance with claim 2, wherein the scanning probes are assembled in a measuring head.

6. Apparatus in accordance with claim 2 wherein said interpretive means comprises a selector unit for selecting a plurality of desired predetermined swivel positions of said body, an interpretive logic circuit, and a swivel drive on said rotary support controlled by said logic circuit so that said swivel drive is turned on when the interpretive logic circuit senses an undesired swivel position, and said swivel drive is turned off when said interpretive logic circuit senses a desired swivel position.

7. Apparatus in accordance with claim 1, characterized in that each scanning probe is a proximity switch, and each transmitter element is a trigger cam suitable for actuating said proximity switch.

8. Apparatus in accordance with claim 1, wherein said rotary support is a chuck with two inwardly projecting clamping jaws swiveling about the swivel axis and comprising said clamps, for holding said body as a workpiece, at least one said jaw having a plate connected to its radially outer face, each said transmitter element being mounted on a said plate and comprising a trigger cam mounted on said plate eccentrically mounted with respect to said swivel axis.

* * * * *